United States Patent
Albert et al.

(10) Patent No.: US 8,074,628 B2
(45) Date of Patent: Dec. 13, 2011

(54) AIR INTAKE DEVICE FOR A HEAT ENGINE WITH A COOLED MAIN CIRCULATION SYSTEM AND A BYPASS SYSTEM EQUIPPED WITH A HEATING MECHANISM

(75) Inventors: Laurent Albert, Vallangoujard (FR); Michael Maitre, Cergy le Haut (FR); Samuel Leroux, Poissy (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 429 days.

(21) Appl. No.: 12/297,055

(22) PCT Filed: Apr. 26, 2007

(86) PCT No.: PCT/FR2007/000717
§ 371 (c)(1),
(2), (4) Date: Oct. 14, 2008

(87) PCT Pub. No.: WO2007/125204
PCT Pub. Date: Nov. 8, 2007

(65) Prior Publication Data
US 2009/0260587 A1   Oct. 22, 2009

(30) Foreign Application Priority Data
Apr. 26, 2006  (FR) ...................................... 06 03711

(51) Int. Cl.
*F02G 5/00*  (2006.01)
*F02B 33/00*  (2006.01)
*F02B 29/04*  (2006.01)

(52) U.S. Cl. ........... 123/543; 123/549; 123/563; 60/599
(58) Field of Classification Search ............... 60/599; 123/563, 41.52, 552, 553, 559.1–556, 543–551
See application file for complete search history.

(56) References Cited

U.S. PATENT DOCUMENTS

| | | | | |
|---|---|---|---|---|
| 4,077,219 A | * | 3/1978 | Melchior et al. | 60/599 |
| 4,483,150 A | * | 11/1984 | Melchior et al. | 60/599 |
| 5,036,668 A | * | 8/1991 | Hardy | 60/599 |
| 5,546,975 A | * | 8/1996 | Pernet | 137/115.16 |
| 7,152,588 B2 | * | 12/2006 | Corba | 123/563 |

(Continued)

FOREIGN PATENT DOCUMENTS

DE  42 42 010 A1  6/1994

(Continued)

OTHER PUBLICATIONS

International Search Report w/translation from PCT/FR2007/000717 dated Aug. 16, 2007 (6 pages).

*Primary Examiner* — Noah Kamen
(74) *Attorney, Agent, or Firm* — Osha • Liang LLP

(57) ABSTRACT

Device for air intake of a heat engine including:
- a main circulation system (105) which connects a supercharging apparatus (106) or an air intake manifold (107) which incorporates a heat exchanger (108),
- a bypass system (109) linked to the main circulation system along the exchanger, the bypass system incorporating a heating apparatus (29),
- a circuit selection device mounted between the main circulation system and the bypass system to channel at least some of the air into one or the other system.

4 Claims, 4 Drawing Sheets

U.S. PATENT DOCUMENTS 7,287,521 B2 * 10/2007 Yang .................. 123/556

FOREIGN PATENT DOCUMENTS

| | | | |
|---|---|---|---|
| DE | 4242010 A1 * | 6/1994 | |
| DE | 195 25 542 A1 | 1/1997 | |
| EP | 0 388 505 A2 | 9/1990 | |
| FR | 2 858 022 A1 | 1/2005 | |
| FR | 2 876 416 A1 | 4/2006 | |
| FR | 2 876 419 A | 4/2006 | |
| FR | 2876416 A1 * | 4/2006 | |
| FR | 2876419 A1 * | 4/2006 | |
| WO | WO 98/25012 | * 12/1996 | |
| WO | 98/25012 A | 6/1998 | |

* cited by examiner

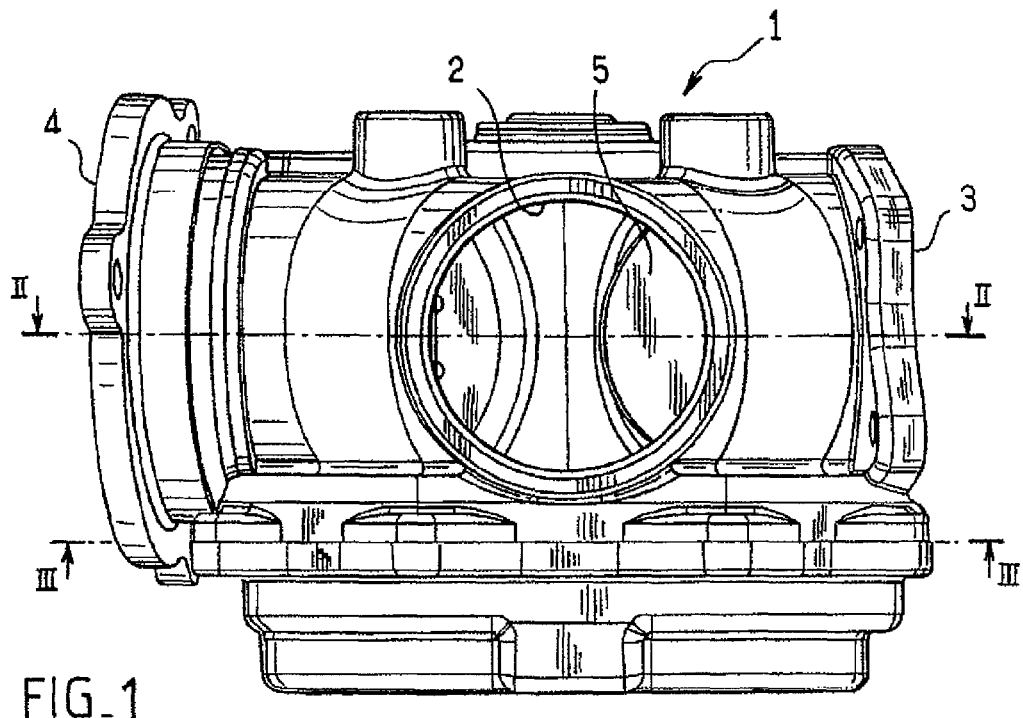
FIG_1
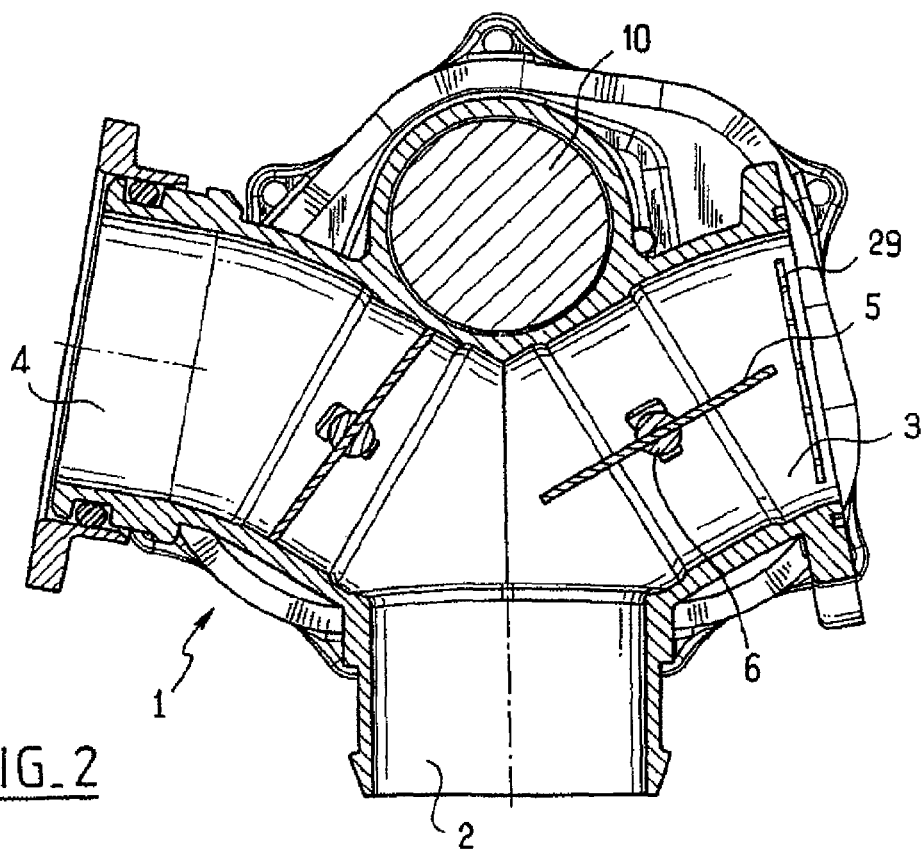
FIG_2

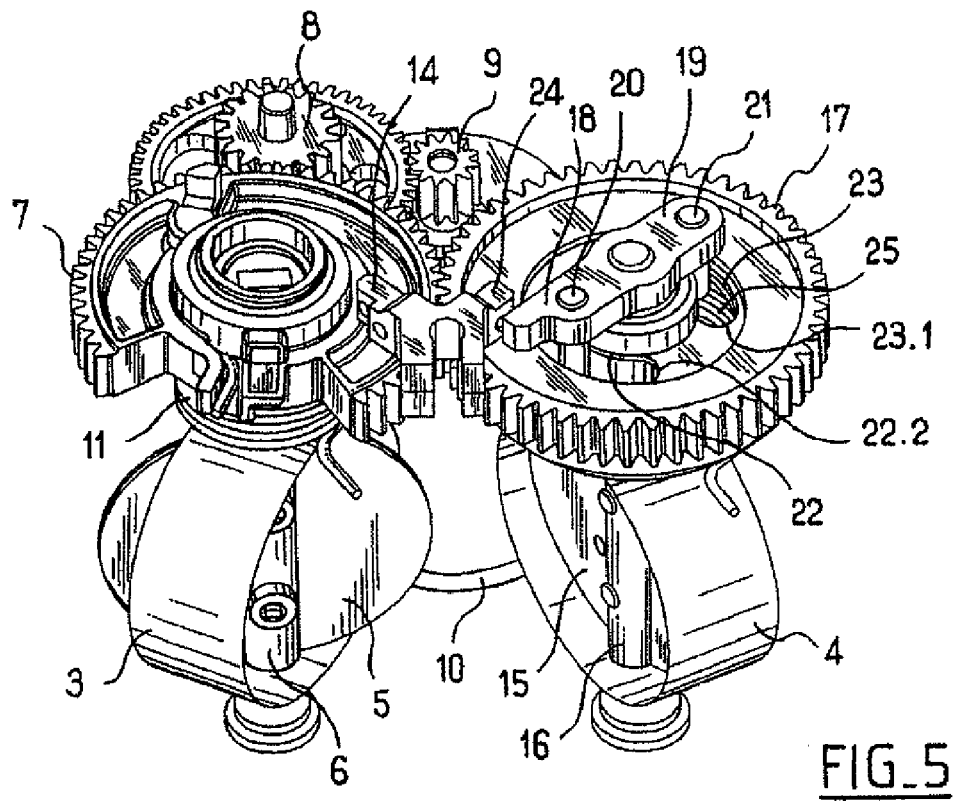
FIG_5
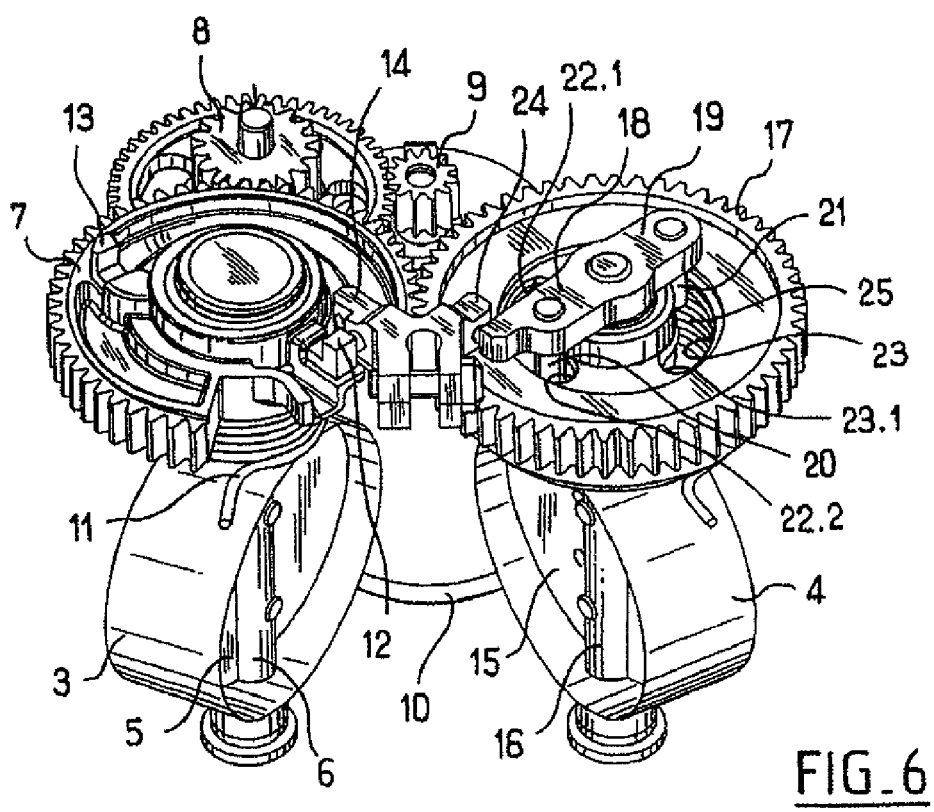
FIG_6

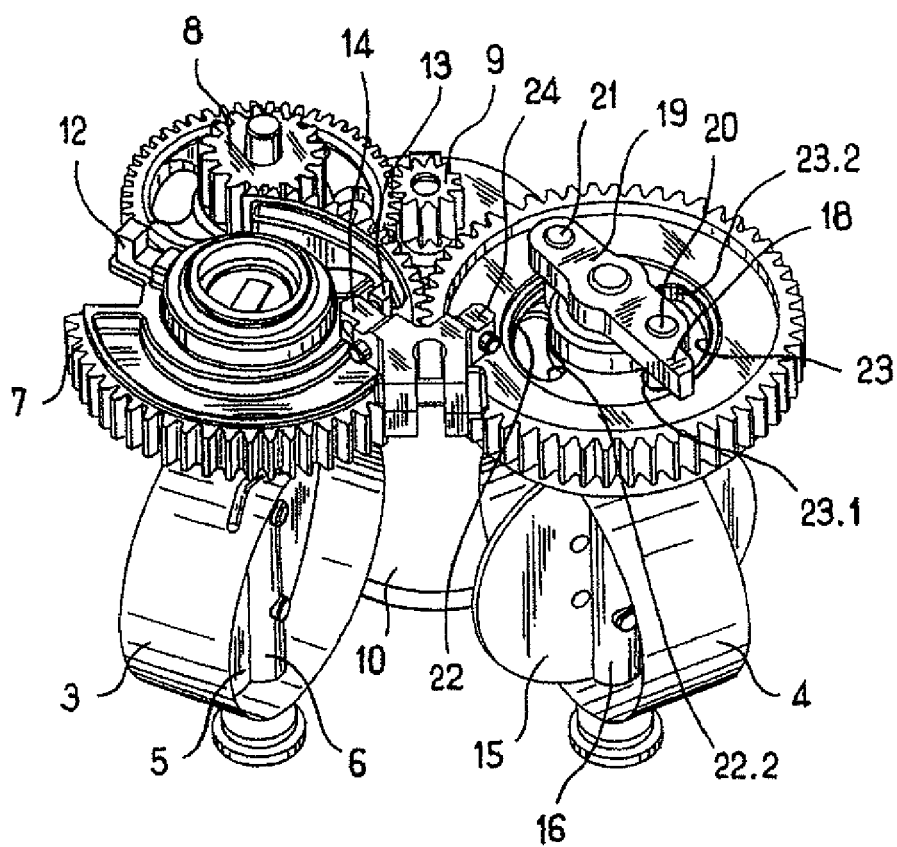
FIG_7
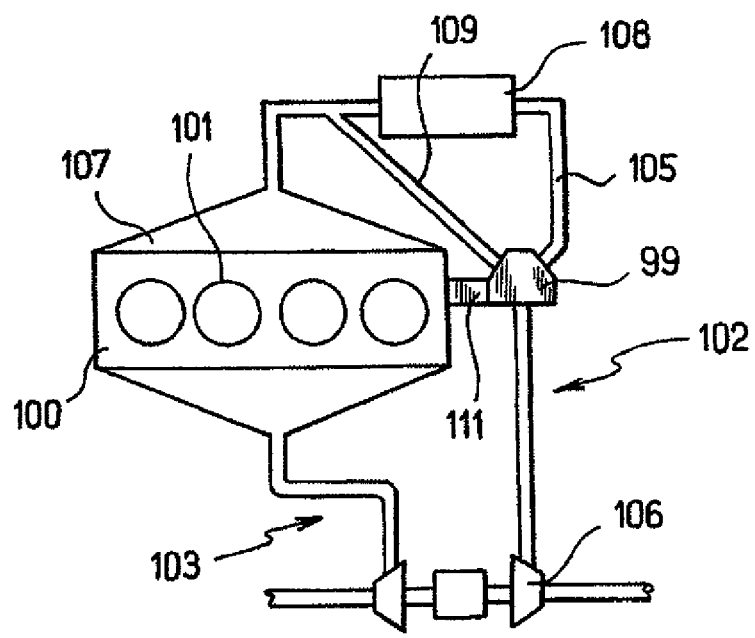
FIG_8

AIR INTAKE DEVICE FOR A HEAT ENGINE WITH A COOLED MAIN CIRCULATION SYSTEM AND A BYPASS SYSTEM EQUIPPED WITH A HEATING MECHANISM

The present invention relates to an air intake device for a heat engine.

BACKGROUND OF THE INVENTION

In supercharged engines, an intake device such as this comprises a main circuit incorporating an intercooler and connecting a supercharger such as a compressor of a turbocompressor to the intake duct of the heat engine. The supercharger further comprises a non-cooled bypass circuit connected to the main circuit on each side of the intercooler. Valves are fitted on the main circuit and the bypass circuit and are controlled by the engine electronic control unit (ECU) in order to direct air toward one or other circuit so as to obtain, in the intake duct, an air temperature that is suited to the desired engine performance.

This system is not, however, always capable of obtaining optimal engine operation, particularly at start-up and at low idle.

OBJECT OF THE INVENTION

One object of the invention is to provide a means for improving engine operation.

SUMMARY OF THE INVENTION

To this end, the invention provides an air intake device for a heat engine, comprising:
- a main circuit which connects a supercharger to an intake manifold and which incorporates a heat exchanger,
- a bypass circuit connected to the main circuit on each side of the heat exchanger, the bypass circuit incorporating a heating member,
- a circuit selection member mounted between the main circuit and the bypass circuit in order to direct at least some of the air to one or other circuit.

The heating member can be used to increase the air temperature, thus making it easier to start the engine and stabilizing engine operation at low idle. The temperature ranges that can be obtained in the intake duct are broadened.

Advantageously, the selection member comprises a valve comprising a body delimiting at least a first pipe connected to the bypass circuit and a second pipe connected to the main circuit, the heating member being incorporated into the first pipe.

The heating member is incorporated into the valve, thus limiting the bulk of the intake device.

As a preference, the valve body is associated with a heat sink member and, possibly, the heat sink member is designed to connect the valve body to an upper part of a cylinder of the heat engine.

This then limits the degree to which the valve body is heated, possibly using the cylinder head as a heat sink.

Other features and advantages of the invention will become apparent from reading the following description of one particular nonlimiting embodiment of the invention.

BRIEF DESCRIPTION OF THE DRAWINGS

Reference will be made to the attached drawings, among which:
FIG. 1 is an elevation of a valve according to the invention,
FIG. 2 is a section on II-II of FIG. 1,
FIG. 5 is a perspective part view with the first shutter in an intermediate position between its first closed position and its open position and the second shutter in its closed position,
FIGS. 6 and 7 are views similar to that of FIG. 5, with the first shutter in its second closed position and the second shutter in its closed position and in its open position, respectively,
FIG. 8 is a schematic view of an engine equipped with an intake device according to the invention.

DETAILED DESCRIPTION OF THE INVENTION

Figure 3:
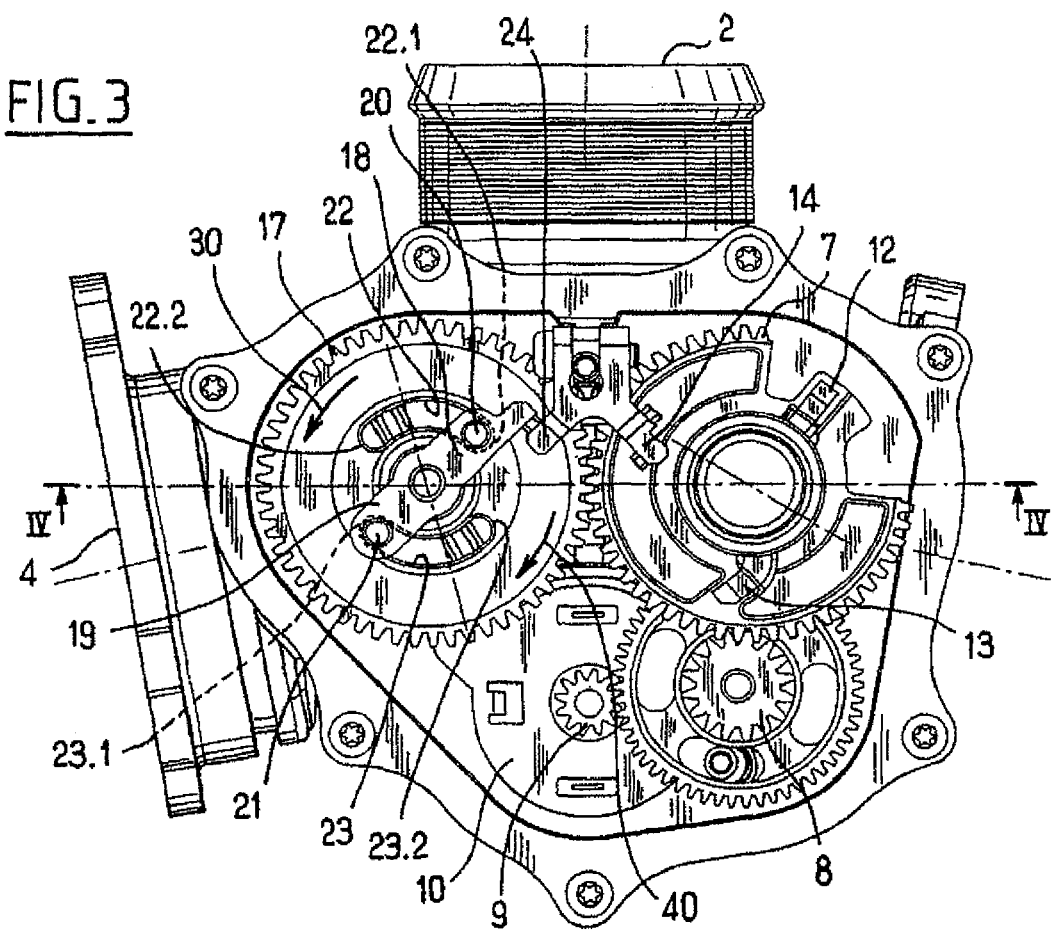
FIG. 3 is a section on III-III of FIG. 1, with the first shutter in its open position and the second shutter in its closed position.
Figure 4:
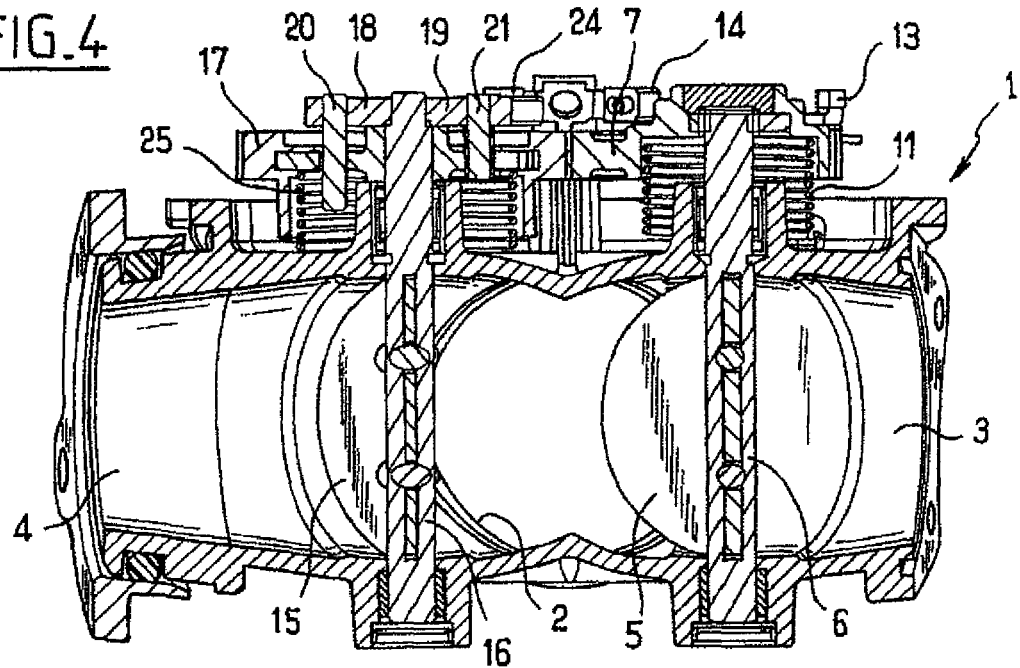
FIG. 4 is a section on IV-IV of FIG. 3.

FIG. 8 depicts an internal combustion piston-type heat engine comprising a block 100 delimiting cylinders 101 which are connected to an intake device denoted overall as a 102 and to an exhaust device 103 known per se. The heat engine is supercharged. The engine components other than the intake device are known per se and are not described here.

The intake device 104 comprises a main air-supply circuit 105 connecting the compressor 106 to the intake duct (or manifold) 107 and incorporating a heat exchanger, in this instance an intercooler 108 known per se. An air-supply bypass circuit 109 is connected to the main circuit 105 on each side of the intercooler 108. The bypass air circuit 109 is connected to the main circuit 105 directly downstream of the intercooler and is connected by a valve 99 upstream of the intercooler.

With reference to FIGS. 1 to 7, the valve 99 used in this embodiment of the invention comprises a body denoted overall as 1 delimiting a first pipe 3 and a second pipe 4 opening into a third pipe 2. The first pipe 3 is connected to the bypass circuit 109. The second pipe 4 and the third pipe 2 are connected to the main circuit 105, the second pipe 4 being connected to the intercooler and the third pipe 5 to the compressor. The body 1 and the pipes 3 and 4 are depicted only partially in FIGS. 5 to 7. FIG. 8 shows that the body 1 is connected to the upper part of the cylinders 101 by a heat sink member 111 formed of a component made of a thermally conductive material.

The first pipe 3 is equipped with a first double shutter or butterfly 5 secured to a spindle 6 mounted to pivot on the body 1. The spindle 6 has one end projecting beyond the body 1 and rotating as one with a toothed first transmission wheel 7 in mesh with an intermediate gearing 8 itself in mesh with a pinion 9 secured to an output shaft of a motor 10 mounted on the body 1. The motor 10 is a DC motor known per se connected to a source of electrical power and to a control module both of which are also known per se and are not depicted in the figures. A torsion spring 11 extends helically around said end of the spindle 6 with one end connected to the transmission wheel 7 and one end connected to the body 1. The spring 11 returns the butterfly 5 to the open position (depicted in FIGS. 2 to 4). The transmission wheel 7 is provided with studs 12, 13 which are designed to collaborate with a stop 14 secured to the body 1. When the stud 12 is in abutment against the stop 14, the butterfly 5 is in a first closed position (depicted in FIG. 6) and when the stud 13 is resting against the stop 14, the butterfly 5 is in a second closed position (depicted in FIG. 7). The butterfly 5 is substantially perpendicular to the pipe 3 when in its first closed position and in its second closed position, these positions being approximately 180° apart.

Resistors, depicted schematically as 29, extend into the pipe 3 downstream of the butterfly 5 and are fixed to the body 1. The resistors 29 allow the fluid to pass and are in the form of fins made of aluminum or of fine resistive strips the thickness and shapes of which are designed not to impede or disturb the flow of the fluid. The resistors 29 comprise means, known per se and not depicted, of connection to an electrical power supply. The resistors 29 form a device for heating the air in the bypass circuit 109.

The second pipe 4 is equipped with a second double shutter or butterfly 15 secured to a spindle 16 which is mounted to pivot on the body 1 and which has one end projecting beyond the body 1 on which a second transmission wheel 17 is mounted such that it can pivot. A support is fixed to this end of the spindle 16. The support defines two arms 18, 19 extending radially from the projecting end of the spindle 6, away from one another. Each arm 18, 19 is provided with a finger 20, 21 housed in a circular-arc-shaped groove 22, 23 formed in the transmission wheel 17. The arm 19 has a free end intended to butt against a stop 24 secured to the body 1 and defining the closed position of the butterfly 15 (which position is depicted in FIGS. 2 to 6). A torsion spring 25 extends in a helix around said end of the spindle 16 and has one end connected to the finger 21 and an opposite end connected to the body 1 in order to return the butterfly 15 to the closed position. In the open position, the butterfly 15 runs substantially along the axis of the pipe 4.

The stops 14, 24 are fixed to a support the position of which can be adjusted relative to the body 1.

The valve thus created has:
  a normal or primary mode of operation in which the butterfly 15 is in the closed position and the butterfly 5 is adjustable in terms of position between its open position and its first closed position (intermediate position depicted in FIG. 5),
  an "off" mode in which the butterfly 15 is in its closed position and the butterfly 5 is in its first closed position (FIG. 6),
  a secondary mode of operation in which the butterfly 15 is in its open position and the butterfly 5 is in its second closed position (FIG. 7).

In the normal mode of operation, the motor 10 can bring the butterfly 5 into any position between its open position and its first closed position (refer to the intermediate position depicted in FIG. 5). When the butterfly 5 is in the open position (FIG. 3), the fingers 20, 21 are housed in one end 22.1, 23.1 of the grooves 22, 23. When the transmission wheel 7 pivots between the position in which the butterfly 5 is open and the first closed position thereof, the transmission wheel 7 drives the transmission wheel 17 (direction of rotation 40 in FIG. 3), causing the fingers to slide along the grooves 22, 23 toward the other end 22.2, 23.2 of these grooves. The butterfly 15 is therefore immobile, held in its closed position by the spring pressing the protrusion of the arm 18 against the stop 24.

When the butterfly 5 is in its first closed position, the fingers 20, 21 are housed in the ends 22.2, 23.2 of the grooves 22, 23 and the butterfly 15 is in its closed position so that the valve is in its "off" mode (FIG. 6).

When the butterfly 5 is returned to its open position from its first closed position, the transmission wheel 7 drives the transmission wheel 17 and the fingers move from the end 22.2, 22.3 of the grooves 22, 23 to the ends 22.1, 23.1 without causing the butterfly 15 to move.

When the transmission wheel 7 is moved in order to bring the butterfly 5 into its second closed position, the transmission wheel 7 causes the transmission wheel 17 to rotate in the direction referenced 30 in FIG. 3. Because the fingers 19, 20 are in abutment against the ends 22.1, 23.1 of the grooves 22, 23, the pivoting of the transmission wheel 17 will cause the support and therefore the spindle 16 and the butterfly 15 to pivot. When the butterfly 5 reaches its second closed position, the butterfly 15 is in its open position. The valve is in its secondary mode of operation (FIG. 7).

When the butterfly 5 is returned from its second closed position to its open position (under the action also of the spring 11), the transmission wheel 17 is driven in the opposite direction (the direction referenced 40) by the transmission wheel 7 and the spring 25 exerts on the finger 21 a return force returning the butterfly 15 to its shutting-off position.

The fingers 20, 21 and the grooves 22, 23 thus form a one-way drive member driving the butterfly 15 in one direction (the direction 30), this member being positive (or active) when the butterfly 5 is being driven from its open position to its second closed position.

It will be noted that the spindles 6, 16 of the butterflies 5, 15 are sited near the third pipe 2 and that:
  in the open position, the butterflies 5, 15 have a part projecting into the pipe 2, preferably as far as the axis of the pipe 2, in order to guide the gases and act as deflectors;
  in the closed position, the butterflies 5, 15 lie near the wall of the pipe 2, and preferably approximately flush with the pipe 2 and parallel to the wall thereof, in order to limit the creation of regions in which the gases can recirculate or cause other disruptions to the flow, so as to reduce pressure drops.

Of course, the invention is not restricted to the embodiment described and alternative forms of embodiment may be added thereto without departing from the scope of the invention as defined by the claims.

In particular, the valve may have a structure other than that described, particularly as far as the layout of the pipes, the geometry of the butterflies, the way in which the second transmission wheel is driven, the means actuating the butterflies, etc., are concerned. The transmission wheels may be belt-driven. The motor may be mesh with the first transmission wheel and with the second transmission wheel, the first transmission wheel then no longer serving as the link between the motor and the second transmission wheel. The body may be made in one or more parts. In place of a double shutter of the butterfly type, it is possible to use single shutters.

The member returning the second butterfly may be a mechanical or electrical drive member.

The one-way drive member may have some structure other than that described and, for example, have just one finger and one groove. A finger may also be secured to the transmission wheel 17 in order to rest against the arm 19.

It goes without saying that the design whereby at least one of the butterflies 5, 15 in the open position has a part projecting into the third pipe 2 and at least one of the butterflies 5, 15 in the closed position lies substantially close to, or even flush with, the third pipe 2 can be applied to any type of valve with three pipes, for example one inlet and two outlets, with two butterflies operated by one or two motors.

Likewise, the resistors 29 can be used in any type of valve that has three pipes, particularly one inlet and two outlets. The heating member may be provided in one and/or other of the pipes and have a different structure from that described. The heating member may also be positioned at a different location in the bypass circuit 109.

Furthermore, the return direction of the springs and the return position of the butterflies may differ from those described hereinabove.

As an alternative, it would have been possible to conceive of the butterflies being actuated by means of two coupled motors each associated with one of the butterflies.

What is claimed is:

1. An air intake device for a heat engine, comprising:
   a main circuit which connects a supercharger to an intake manifold and which incorporates a heat exchanger;
   a bypass circuit connected to the main circuit on each side of the heat exchanger; and
   a circuit selection member mounted between the main circuit and the bypass circuit in order to direct at least a portion of air to either one of the main circuit and the bypass circuit,
   wherein the bypass circuit incorporates a heating member,
   wherein the circuit selection member comprises a valve comprising a body delimiting at least a first pipe connected to the bypass circuit and a second pipe connected to the main circuit, and wherein the heating member is incorporated into the first pipe.

2. The device as claimed in claim 1, in which the valve body is associated with a heat sink member.

3. The device as claimed in claim 2, in which the heat sink member is designed to connect the valve body to an upper part of a cylinder of the heat engine.

4. The device as claimed in claim 1, in which the first and second pipes open into a third pipe and wherein the first pipe is provided with a first shutter and the second pipe is provided with a second shutter, wherein the first and second shutters are connected to drive means designed to move the first and second shutters between positions for opening and closing the first and second pipes.

* * * * *